(12) United States Patent
Dirksen et al.

(10) Patent No.: US 6,756,966 B2
(45) Date of Patent: Jun. 29, 2004

(54) DISPLAY DEVICE ESPECIALLY FOR A MOTOR VEHICLE

(75) Inventors: Susanne Dirksen, Wolfsburg (DE); Roland Holz, Braunschweig (DE); Christof Oelrich, Milan (IT)

(73) Assignee: Volkswagen AG, Wolfsburg (DE)

(*) Notice: Subject to any disclaimer, the term of this patent is extended or adjusted under 35 U.S.C. 154(b) by 246 days.

(21) Appl. No.: 10/008,384

(22) Filed: Dec. 6, 2001

(65) Prior Publication Data

US 2002/0041273 A1 Apr. 11, 2002

Related U.S. Application Data

(63) Continuation of application No. PCT/EP00/04812, filed on May 26, 2000.

(30) Foreign Application Priority Data

Jun. 29, 1999 (DE) .......................................... 199 29 587

(51) Int. Cl.[7] .............................................. G09G 5/00
(52) U.S. Cl. ........................ 345/156; 340/995; 345/1.1
(58) Field of Search ......................... 345/87, 156, 1.1, 345/1.2, 161, 167, 173; 340/461, 439, 441, 990, 995

(56) References Cited

U.S. PATENT DOCUMENTS

| | | | | |
|---|---|---|---|---|
| 3,909,525 A | * | 9/1975 | Fagan | 348/383 |
| 4,319,541 A | * | 3/1982 | Sullivan et al. | 116/318 |
| 4,635,029 A | * | 1/1987 | Yamada | 398/136 |
| 5,237,441 A | | 8/1993 | Nhu | 359/152 |
| 5,691,695 A | * | 11/1997 | Lahiff | 340/461 |
| 5,917,436 A | | 6/1999 | Endo et al. | 340/995 |
| 6,112,445 A | * | 9/2000 | Feeney | 40/747 |
| 6,115,025 A | * | 9/2000 | Buxton et al. | 345/659 |
| 6,302,612 B1 | * | 10/2001 | Fowler et al. | 403/76 |
| 6,462,730 B2 | * | 10/2002 | Numata et al. | 345/156 |
| 6,557,281 B1 | * | 5/2003 | Lewiner et al. | 40/471 |
| 6,600,144 B2 | * | 7/2003 | Matthies | 250/208.1 |

* cited by examiner

Primary Examiner—Amare Mengistu
(74) Attorney, Agent, or Firm—Baker Botts L.L.P.

(57) ABSTRACT

A display device, especially for a motor vehicle, includes a display unit a display controller and at least one control unit, with which the image format of the display unit can be controlled. The display unit is configured such that it can be moved to enable different display fields to be viewed.

13 Claims, 5 Drawing Sheets

DISPLAY DEVICE ESPECIALLY FOR A MOTOR VEHICLE

This application is a Continuation of: PCT/EP00/04812 filed May 26, 2000, incorporated by reference herein.

BACKGROUND OF THE INVENTION

The invention relates to a display device, especially for a motor vehicle, wherein the image displayed can be varied.

Display devices are known, for example for displaying the digital street maps of a navigation system. Here the display unit, which is designed for example as an LCD or a monitor, is operated by means of a display controller, which continuously changes the representation on the display unit as a function of current position. Moreover, the display controller changes the image format on the display unit as necessary depending on commands entered through input control. Since the available installation space is limited, especially in motor vehicles, repeated efforts have been made to allocate multiple convenience systems to an existing display device, so that the information from various systems can be displayed as needed. Using a menu, for example, the user can select a system whose information is displayed generally in the form of another menu. As is known from the computer field the information and input options that are offered are organized hierarchically in sub-menus. A disadvantage of the known display devices is that the user can easily lose track of where he is currently located in the menu system. Another disadvantage arises when the user wishes to switch between individual displays, since the superposition of multiple menus known from the computer field can be used only to a limited extent because of the size of the display unit.

It is an object of the invention to provide an improved display system for providing alternate display images.

SUMMARY OF THE INVENTION

As a result of a movable image format on the display unit, or a movable display unit with a visual field delimitation, where the entire display unit can be used to present information, the display device can be associated with several systems at once, where only the information for one system is presented on the display unit at any one time.

The movable display device can be moved either directly through a manual mechanical transmission of force and/or indirectly through a control unit. In the case of indirect movement, the input commands that are entered via the control unit are converted into control signals for actuators, for example for stepper motors.

In a preferred embodiment, the display unit is designed as a hemispherical or spherical shell, by which means a large display area on a spherical surface is achieved in a small installation space.

In another preferred embodiment, a stop is associated with the display unit for each direction of motion, so that the display unit can be returned to a base setting by means of a spring return device.

The control unit is preferably designed as a trackball and/or as a joystick, where motion control of the display unit, in the form of a hemispherical or spherical shell, is very simple, especially with a trackball. In principle, the input unit can also be designed as a pushbutton or rocker switch.

The display unit is preferably designed as a touch screen, whose touch-sensitive fields form a control unit that can be used to input movement commands as well as data and control commands.

In a further preferred embodiment, the display device is integrated into a steering device of a motor vehicle, so that a vehicle driver has the display unit in his direct field of view. Depending on the form of the display unit, it may be necessary to modify the steering device to accommodate the display unit for this purpose. It is advantageous for this purpose to design the steering device as a steer-by-wire system. The advantage of steer-by-wire systems, as for example per U.S. Pat. No. 5,237,441 or DE 42 15 630 A1, is that the centrally located steering linkage is eliminated, which significantly simplifies the integration of spherical display units in particular.

The invention is described in detail below using example embodiments.

DESCRIPTION OF THE INVENTION

Figure 1:
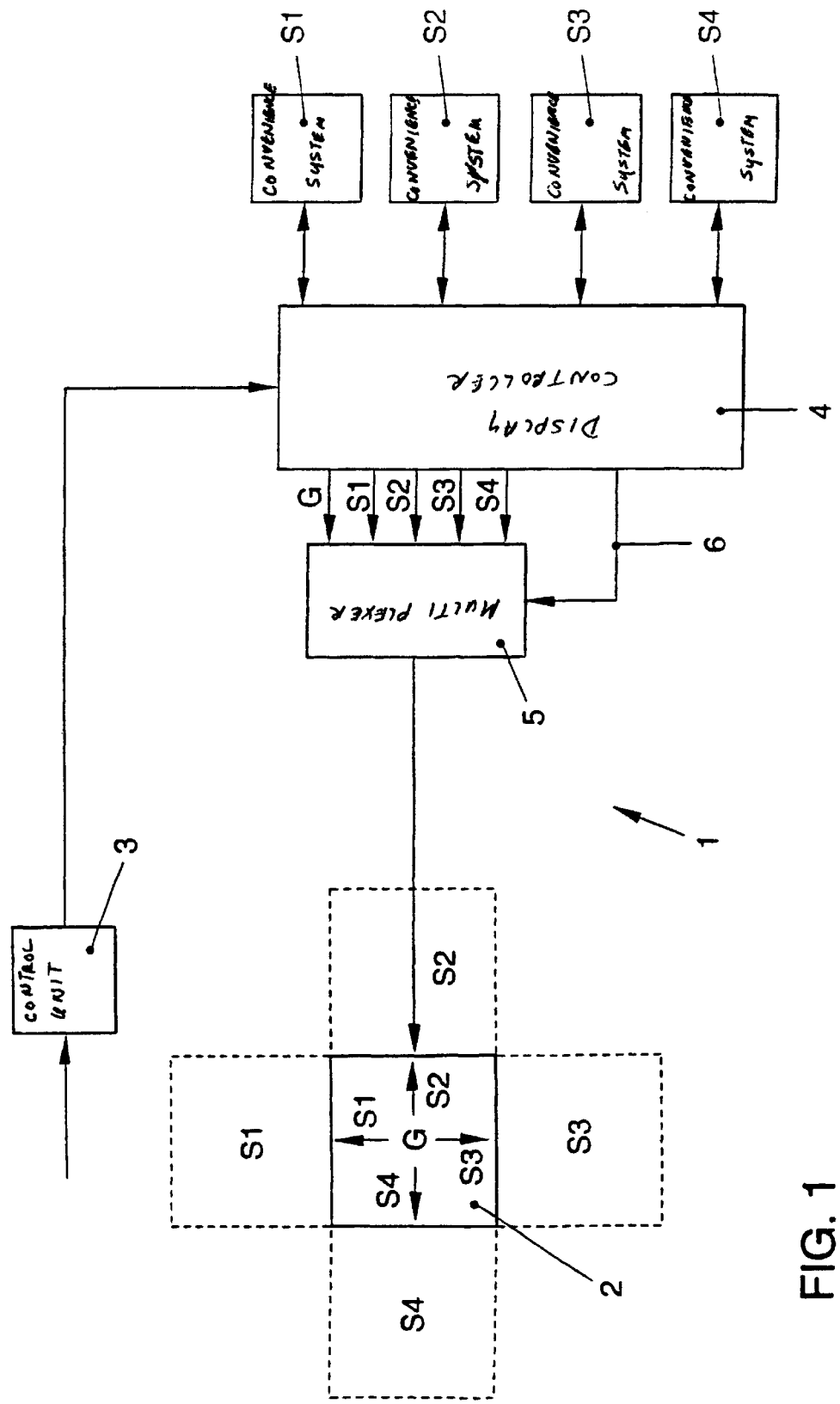
FIG. 1 is a schematic block diagram of a display device with movable image format in a base position.

Referring to FIG. 1 display unit 1 comprises a display device 2, a control unit 3, a display controller 4, a multiplexer 5 and four convenience systems S1–S4. The control unit 3 is connected to the display controller 4, which is bidirectionally connected to the four convenience systems S1–S4. The display controller 4 is connected to the display unit 2 through the multiplexer 5 and controls the image format on the display unit 2, which may be an LCD display or monitor, for example. Both movement commands and control commands for the convenience systems S1–S4 may be entered via the control unit 3.

Figure 2:
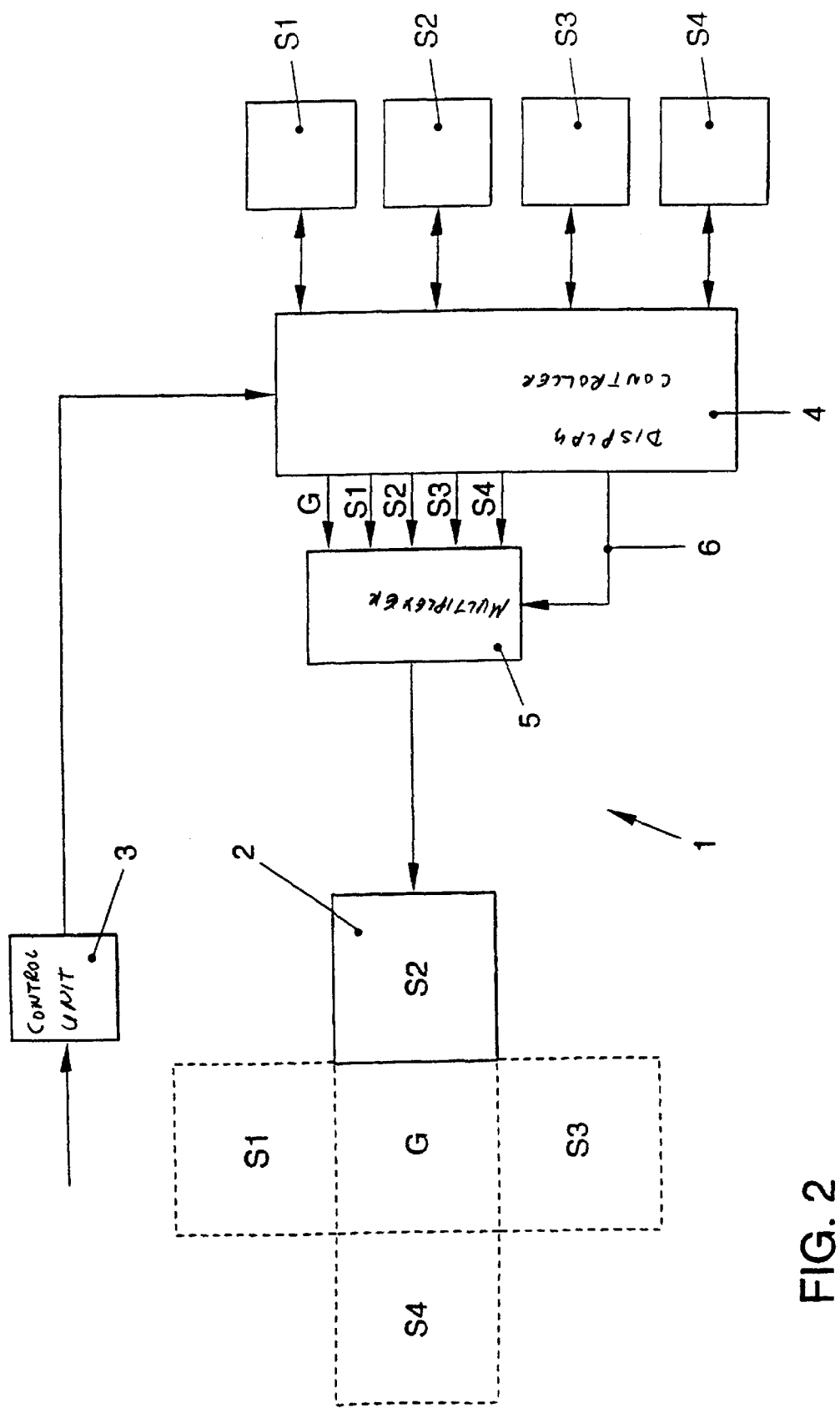
FIG. 2 is a schematic block diagram of the display device of FIG. 1 in a second position.

The image formats for all four convenience systems S1–S4 are generated independently of one another, and each can be displayed individually in a corresponding display field. In a base position G, the display controller 4 supplies a corresponding image format to the display unit 2 through the multiplexer 5. This image format displays for convenience systems S1–S4 can be separately called for and displayed by the display unit 2. For this purpose, a direction of motion may be associated with each image format of a convenience system S1–S4. For example, if a motion "to the right" is entered via the control unit 3, this is received by the display controller 4 and converted into a control command for the multiplexer 5. This control command is transmitted to the multiplexer 5 through a control line 6, so that the image format of convenience system S2 is now presented on the display unit 2, as is shown in FIG. 2. In this way, the individual image formats of the four convenience systems S1–S4 are conceptually arranged around the display unit 2 and can be moved into the display unit 2 by means of the control unit 3. Hence, in this arrangement, the display unit 2 remains spatially fixed in place, and the image format to be displayed is moved via the control unit 3.

Alternatively, the display unit 2 itself can be moved. In this case, it is assumed that the display area is of cruciform design, where the image formats for all four convenience systems S1–S4 and the base position can be displayed simultaneously on the display unit. In this case, the display unit 2 is associated with a housing having a transparent opening that defines a field of view the size of an image data display format. Since all image formats are displayed in parallel, the multiplexer 5 is not required. There is a positioning device by means of which the display unit can be moved relative to the housing, so that the desired image data display can be moved into the field of view. However, in a planar design of the display unit, a correspondingly greater installation space is needed, which does not satisfy the prerequisites in a motor vehicle.

Figure 3:
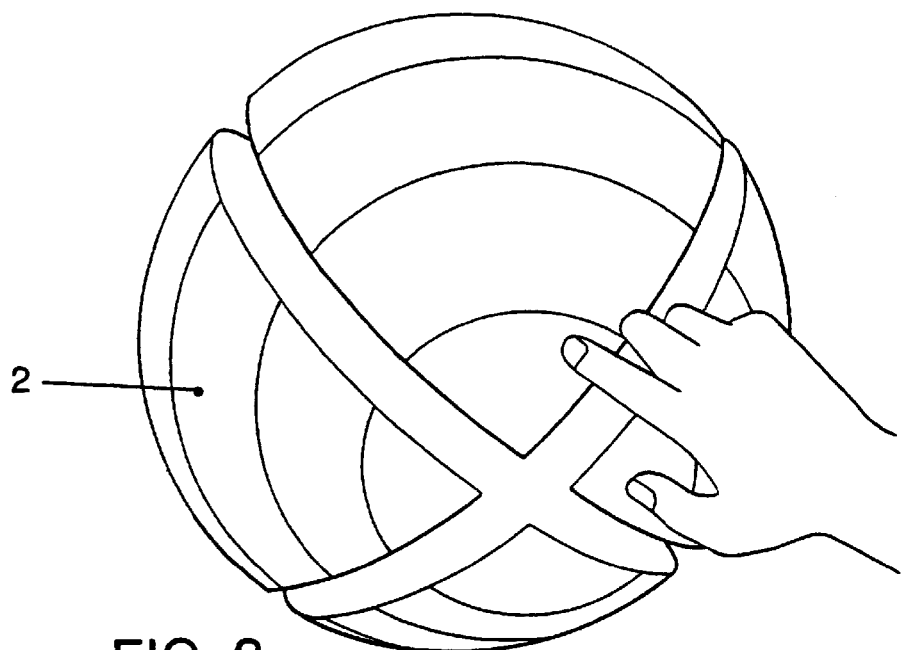
FIG. 3 is a perspective view of a spherical display unit.
Figure 4:
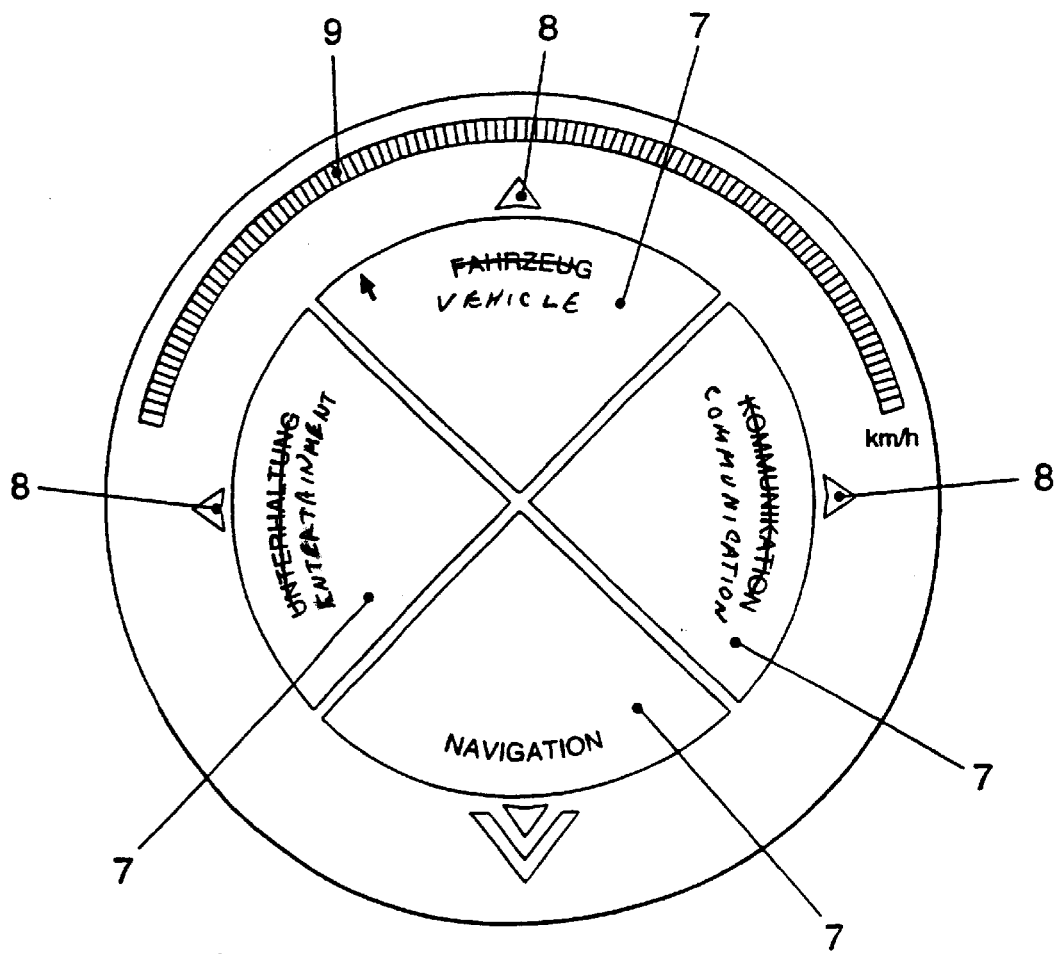
FIG. 4 shows a field of view of the display unit per FIG. 3 in a base position.

FIG. 3 shows a display unit 2 designed as a spherical shell. The spherical shell is designed with an opening through which electrical lines can pass into the interior of the spherical shell. In contrast to a planar design, the area of the display unit can be implemented with a compact construction with a spherical shell. The spherical shell is then arranged in the instrument panel, for example, and the image projected on the spherical shell is moved or rotated, wherein the rotatability can also be restricted to specific axes. By means of the lateral delimitation in the installation location, or by means of a display housing, the field of view on the spherical shell is limited to a segment of a sphere, defined by a transparent opening in the housing, so that for example a display as shown in FIG. 4 results. The motion or rotation is accomplished, for example, by an electrical positioning system that receives its control commands via an control unit 3. In this case, the control unit 3 is preferably adapted to the motions that are to be performed. If the motion is limited to two axes, the control unit 3 can be designed as a four-way pushbutton switch or rocker switch. Control unit 3 may also comprise touch sensitive portions of the display 2. In the case of possible rotations about multiple axes, trackballs or joystick-like controls are used advantageously.

FIG. 4 shows the display unit 2 in a base position. The image format in the field of view includes four display fields 7 in the form of segments of a circle, each of which is associated with a convenience system. Each display field 7 has associated with it a pictogram-shaped arrow 8 from which is derived the direction of motion for the image format of the associated convenience system. Moreover, a semicircular indicator scale 9, for example for vehicle speed, is located above the display fields 7. If the user wishes to see the image format for the navigation system in the field of view, the spherical shell must be rotated downwards, as the larger arrow is intended to indicate. In this regard, a threshold torque can be associated with each direction of rotation, where the spherical shell rotates through a fixed angle once this torque is exceeded, so that the display field located in the direction of rotation is fully displayed in the field of view.

Figure 5:
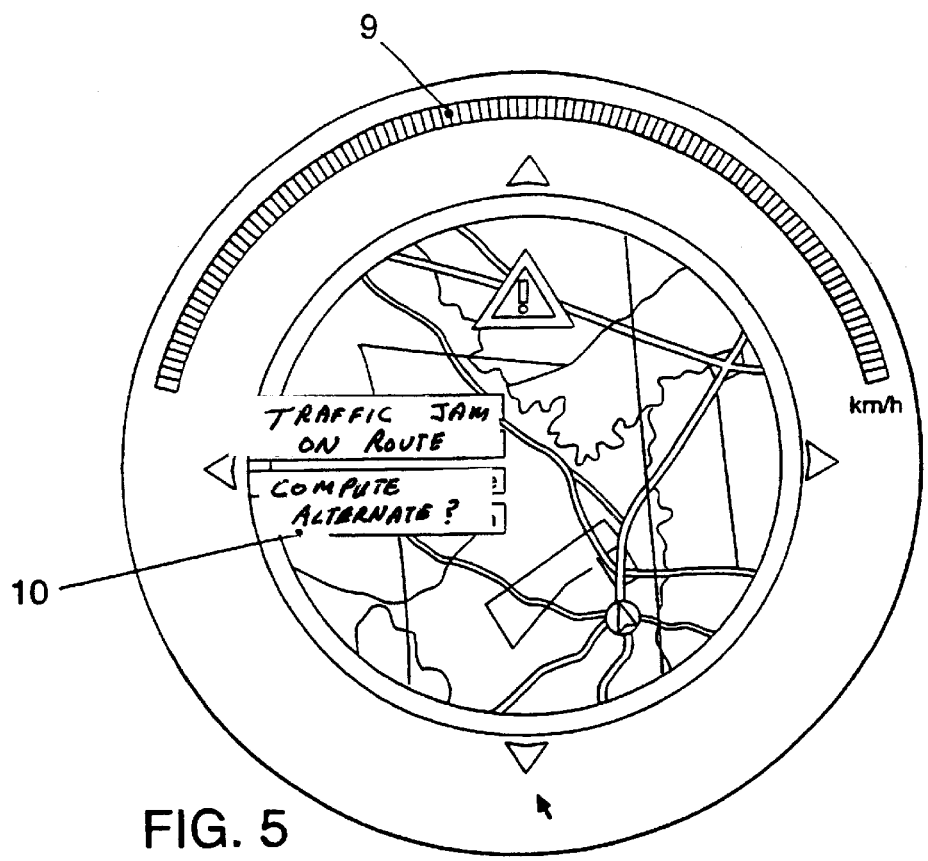
FIG. 5 shows a field of view of the FIG. 3 display unit in a second position.
Figure 6:
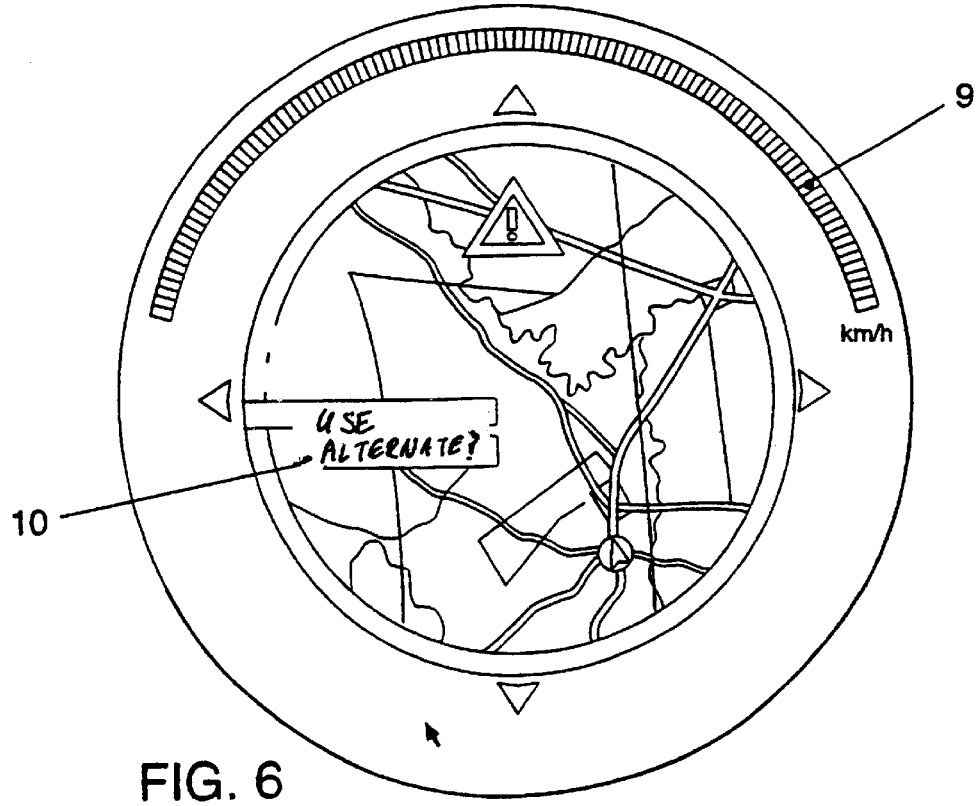
FIG. 6 shows the field of view of FIG. 5 after entry of a command.

Once rotation in the direction of the arrow is completed, an image format for the navigation system appears, as shown in FIG. 5. The indicator scale 9 can be permanently associated with each image format, so that it is always visible in the same position in the field of view regardless of which image format has been selected. When the display unit is designed as a touch screen, input positions over touch-sensitive fields 10 can be displayed in a visually highlighted manner. In the example shown, the user is asked whether an alternate route should be calculated. Now if the touch-sensitive field 10 is touched or the command is entered via another control unit, the alternate route is calculated and displayed in accordance with FIG. 6. If the user now wishes to switch from the navigation system to the entertainment system, the spherical shell is first rotated upward again and is then rotated to the left. In addition, each direction of motion can be associated with a stop having a return device. In the example as shown in FIG. 6, a further downward rotation would cause the spherical shell to be rotated back to the position shown in FIG. 4.

Figure 7:
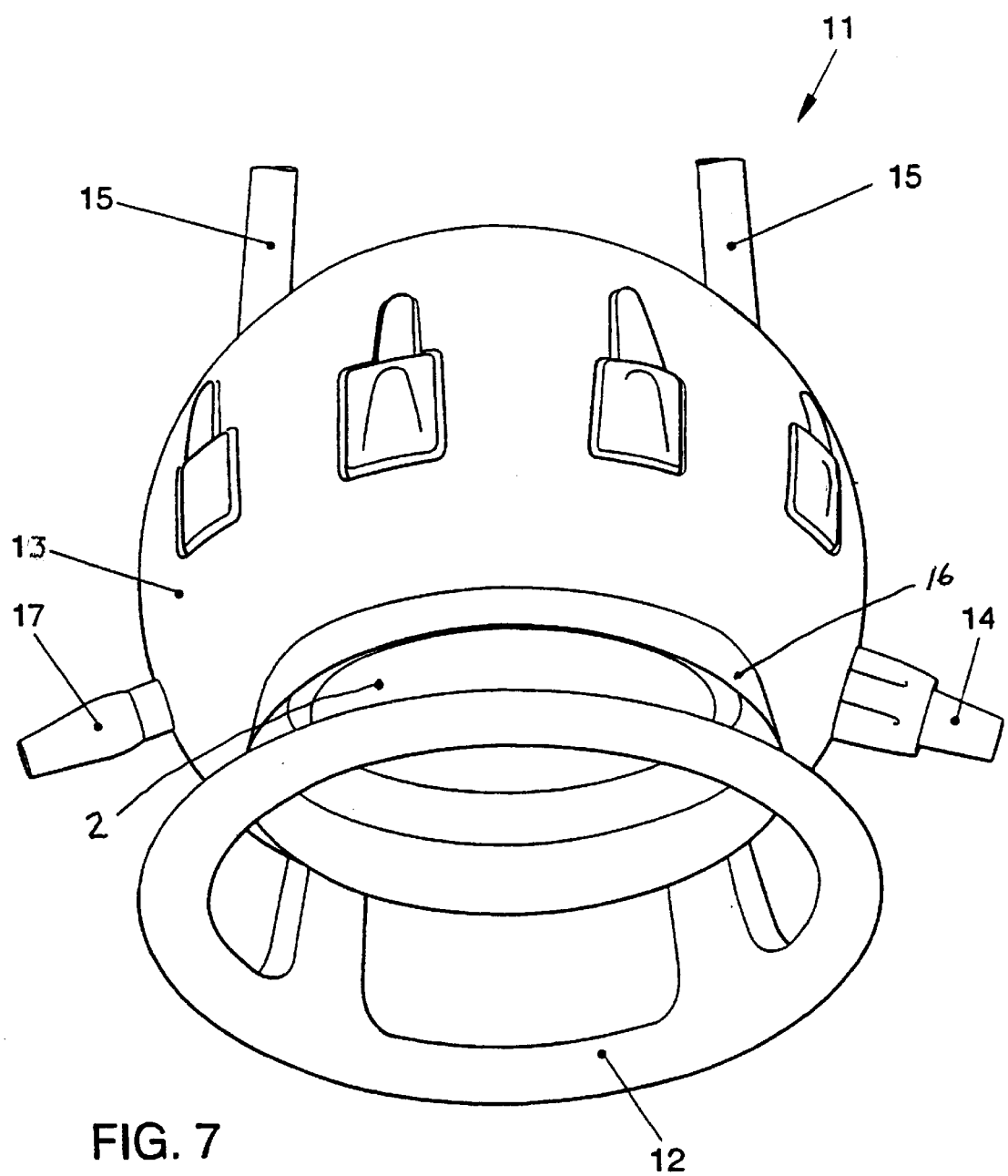
FIG. 7 is a perspective view of a steering device to accommodate a display unit.

FIG. 7 shows a perspective view of a steering device 11 to accommodate a display unit 2 in the form of a spherical shell. The steering device 11 includes a steering wheel 12, a base body 13 in the form of a spherical shell, steering angle sensors 14 and mechanical fastening devices 15. The base body 13 in the form of a spherical shell has an opening in the vicinity of the steering wheel 12 that is surrounded by a ridge-shaped border 16. The spherical-shell-shaped display unit 2 is rotatably arranged within the base body 13, where the opening and the border 16 form a transparent opening. The supply cables and control lines for the display unit 2 pass into the base body 3 through a cable feedthrough 17.

While there have been described what are believed to be the preferred embodiments of the invention, those skilled in the art will recognize that other and further changes can be made thereto without departing from the spirit of the invention, and it is intended to claim all such changes and modifications as fall within the true scope of the invention.

We claim:

1. A display device, comprising:
    a display housing including a transparent opening;
    a display unit mounted within said display housing and including a display area larger than said opening; and
    a display controller for providing display signals to said display unit, said display signals generating display images of selected display data in assigned display fields of said display area;
    wherein said display unit is moveable with respect to said display housing for viewing data displayed in said display fields of said display area through said transparent opening.

2. A display device according to claim 1 wherein said display device is arranged to be moved manually.

3. A display device according to claim 1 wherein said display area of said display unit is spherical.

4. A display device as specified in claim 3 wherein said display unit is a spherical shell.

5. A display device as specified in claim 1 wherein said display device is responsive to manual touching, and wherein said display device includes locations for activation of movement of said display by touching.

6. A display device according to claim 1 further including a control unit for controlling movement of said display unit in said display housing.

7. A display device as specified in claim 6 wherein said control unit is a trackball.

8. A display device as specified in claim 6 wherein said control unit is a joystick.

9. A display device as specified in claim 1 wherein said display unit is a touch screen display.

10. A display device as specified in claim 1 wherein motion of said display unit is limited by a stop mechanism.

11. A display device as specified in claim 1 wherein said housing is arranged as part of the steering mechanism of a vehicle.

12. A display device as specified in claim 11 wherein said display housing comprises a spherical shell and wherein a steering wheel is mounted on said shell.

13. A display device as specified in claim 12, wherein said steering wheel is coupled to a steer-by-wire steering arrangement.

* * * * *